US008479293B2

(12) United States Patent
McIlroy (10) Patent No.: US 8,479,293 B2
(45) Date of Patent: Jul. 2, 2013

(54) SECURITY TECHNIQUE FOR AN OPEN COMPUTING PLATFORM SYSTEM

(75) Inventor: Guy McIlroy, Sunnyvale, CA (US)

(73) Assignee: Access Co., Ltd., Tokyo (JP)

( * ) Notice: Subject to any disclaimer, the term of this patent is extended or adjusted under 35 U.S.C. 154(b) by 587 days.

(21) Appl. No.: 09/727,953

(22) Filed: Nov. 30, 2000

(65) Prior Publication Data
US 2002/0066023 A1 May 30, 2002

(51) Int. Cl.
G06F 11/00 (2006.01)
G06F 12/14 (2006.01)
G06F 12/16 (2006.01)
G08B 23/00 (2006.01)

(52) U.S. Cl.
USPC ............................ 726/24; 713/188; 703/22

(58) Field of Classification Search
USPC .................. 726/24; 713/187, 188; 380/229, 380/241, 247, 258
See application file for complete search history.

(56) References Cited

U.S. PATENT DOCUMENTS

| 5,953,502 | A * | 9/1999 | Helbig, Sr. .................... 726/24 |
| 6,334,118 | B1 * | 12/2001 | Benson ......................... 705/52 |
| 6,374,357 | B1 * | 4/2002 | Mohammed et al. ............. 726/5 |
| 6,481,632 | B2 * | 11/2002 | Wentker et al. ............... 235/492 |
| 6,662,020 | B1 * | 12/2003 | Aaro et al. .................. 455/552.1 |
| 6,694,436 | B1 * | 2/2004 | Audebert ......................... 726/9 |
| 6,760,441 | B1 * | 7/2004 | Ellison et al. .................. 380/45 |
| 6,907,396 | B1 * | 6/2005 | Muttik et al. ................... 703/22 |
| 6,948,070 | B1 * | 9/2005 | Ginter et al. .................. 713/193 |
| 6,981,279 | B1 * | 12/2005 | Arnold et al. ................... 726/22 |
| 7,080,407 | B1 * | 7/2006 | Zhao et al. ..................... 726/24 |
| 7,243,236 | B1 * | 7/2007 | Sibert .......................... 713/179 |
| 2001/0051928 | A1 * | 12/2001 | Brody ............................. 705/52 |
| 2002/0069263 | A1 * | 6/2002 | Sears et al. .................... 709/218 |

* cited by examiner

Primary Examiner — Nadia Khoshnoodi
(74) Attorney, Agent, or Firm — Berry & Associates P.C.

(57) ABSTRACT

The present invention relates to a method for ensuring the security of an open platform. Specifically, the present invention pertains to a method of using a validation program, itself highly secure, to evaluate and securely flag files in software to be loaded and used on palmtop computing devices. The method prevents the infiltration and unauthorized installation of viruses, Trojans, and other known methods of compromising security in an open-platform system. Control of access to the operating system and the operation of applications and macros in a palmtop device is therefore maintained in the user.

17 Claims, 10 Drawing Sheets

SECURITY TECHNIQUE FOR AN OPEN COMPUTING PLATFORM SYSTEM

FIELD OF THE INVENTION

The present invention relates to a method for improving the security of an open computing platform system.

BACKGROUND OF THE INVENTION

The phenomenal rate of development of computing hardware has been paralleled by development of the application of computers to an ever longer list of uses. Indeed, the number of present uses of computers is thousands of times larger than early manufacturers expected. This has been particularly noticeable with developments surrounding the Internet.

One of the reasons for this is the adoption of an "open platform" philosophy by the more successful computer manufacturers. A platform is the combination of hardware and operating system in which any application software must operate in order to function. An "open platform" is the opening by the manufacturer of the development of applications which use the platform to third party developers. This opening is the release of the knowledge of the architecture, operating environment and operating system quirks. While such an opening of a platform results in the development of many more applications than any one company can provide, it can also have results that are not so benign.

The development of the Internet, in addition to providing an enormous field of opportunity for application developers, has also provided direct access between computer users, software developers, providers of various services, and those who would exploit this direct access for their own purposes. One of the several means of exploitation is the Trojan Horse.

In software parlance, a Trojan horse, or Trojan for short, is a piece of software operating inside a computer that, while appearing to be something else, among other possibilities, allows an outside party to defeat the computer's security systems and gain access to an otherwise secure computer system. Trojans are almost always part of software that accomplishes something the user desires. Though not a requisite for the operation of a Trojan horse, the direct accessibility provided by the Internet is what gives the security breaching capability of the Trojan its usability. Some third-party software developers, unfortunately, have produced software containing Trojan horses.

Another unwanted phenomenon is the computer virus. A virus behaves much as its biologic namesake, infecting computer systems, performing unwanted actions and, unlike a Trojan, reproducing itself on other computer systems. While the rationale behind a virus is not as understandable as that of a Trojan horse, viruses do sometimes materialize in third-party software.

Further development of computer systems has enlarged the playing field for third-party developers. In recent years, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result of their size, palmtops are readily carried about in a briefcase or purse, and some palmtops are compact enough to fit into a person's pocket. Palmtop computer systems are also lightweight and so are exceptionally portable and convenient. A very recent development of palmtops is their direct Internet access capability.

One of the most important uses of the palmtop or PDA involves its ready synchronization with a host computer. Synchronization allows the near-instantaneous exchange of data and programs between a PDA and a laptop, desktop or workstation to which it is coupled, whether by cable, RF link or infrared connection. In this way it is extremely convenient to exchange data or load various application programs on a PDA. This is especially true of software that has been downloaded to the desktop from the Internet. Because the leading palmtop brands are all open platforms, an enormous library of very useful applications has been developed by a vibrant developer community and is available via the internet.

Some palmtops are capable of direct access to the Internet. With direct access, they are able to synchronize files which are resident at some remote location over the net directly. Unfortunately, this means the field is ripe for those developers who would abuse the system with invasive routines in their software that would allow security breaches from the Internet connection.

Similar to synchronization, "beaming" of applications and data, via infrared connection (implemented on most popular brands), between palmtops or PDAs has become popular. This peer-to-peer exchange offers extraordinary convenience but brings with it another possible breach of on-board security.

Some data resident on some PDAs are confidential to the user. Modern corporate environments include thousands of users of PDAs who carry data vital to the corporate existence. Private users maintain the details of their private lives on their palmtops. Almost all users have data they don't want to share with unauthorized others or that they can't afford to lose. All of his data is needs to be protected from loss or compromise.

The hotly competitive arena of corporate operations means that there are those who would use any means at hand to acquire another company's confidential data. Others, for reasons unfathomable to rational minds, would destroy users' work for the apparent fun of it.

There exists a need, then, to protect data files resident on a palmtop. Sometimes it is protected by password to exclude unauthorized access. Sometimes it is encrypted to prevent understanding of the data by an unauthorized person who does gain access to it. There are other means of restricting access to the data. These protection methods are typically implemented as security APIs (application provider interfaces). These security API's are typically what are attacked by Trojan horse routines.

There is also a well established supply of software packages that are capable of scanning files loaded on a computer from either the Internet or from packaged media. Some of these that protect against security encroachments are part of "firewall" and virus guard packages. As yet, however, the large size of such packages-and the limited size of data storage on a typical palmtop precludes the use of firewalls or other virus guards resident in the devices. If palmtops and PDA's were, as a category, closed platforms, it would be somewhat more difficult to write invasive routines, but the number of applications written would be suppressed, reducing use and, therefore, sales. A need exists, therefore, for some means of allowing a computer manufacturer to operate under an open platform system yet prevent the inadvertent installation of Trojan horses (and viruses) as part of the software used in a palmtop computing device.

SUMMARY OF THE INVENTION

The present invention relates to a method for ensuring the security of an open platform. Specifically, the present invention pertains to a method of using a validation program, itself highly secure, to evaluate and securely flag files in software to be loaded and used on palmtop computing devices. The method prevents the infiltration and unauthorized installation of viruses, Trojans, and other known methods of compromising security in an open-platform system. Control of access to the operating system and the operation of applications and macros in a palmtop device is therefore maintained in the user.

One embodiment includes a method for ensuring the security of third-party software in a computer system, comprising loading the software on the computer system, validating the software by the use of a validator program, marking the software as valid or invalid by the use of a digital signature flag, and denying further access of the third party software to the computer system if the validator fails to identify the software as valid and clean of viruses, Trojans, and other security compromising routines.

BRIEF DESCRIPTION OF THE DRAWINGS

The operation of this invention can be best visualized by reference to the drawings.

DETAILED DESCRIPTION

In the following description of the present invention, numerous specific details are set forth in order to provide a thorough understanding of the present invention. However, it will be recognized by one skilled in the art that the present invention may be practiced without these specific details or with equivalents thereof. In other instances, well-known structures and devices are shown in block diagram form in order to avoid obscuring the present invention.

Described herein is a new method for improving the security of an open platform. This is done by insuring that applications from third party developers are free of Trojan horse routines. In the description of the embodiment herein, the terms "portable computing device", "palmtop computer", "handheld computer" and "personal data assistant" or PDA are used interchangeably. In every case the terms refer to any portable computing device that can be programmed with software downloaded from a network, desktop computer or workstation by some means of synchronization. The terms "host computer", "laptop", "desktop computer", "desktop" and "workstation" are similarly used interchangeably and all mean any computer capable of synchronization with a palmtop device.

In the embodiment of the present invention implemented in PDA applications whose source is a third party developer, applications are typically downloaded from the third party's website or are loaded from a vendor-supplied disk to a desktop computer. A supplied "install" file is usually compressed in some way and, when installed or extracted on the desktop, materializes as an executable file ready for loading to the PDA in a proprietary form suitable for operation in the PDA's operating environment. There are also, typically, support files that emerge during installation, some of which may remain on the desktop or workstation and some of which may be loaded on the palmtop. The loading of the application typically occurs during a synchronization which in some embodiments may be known as "HotSync". Though the embodiment envisioned here uses this pre-synchronization phase in its operation, other embodiments could use other phases to the same end result.

In this embodiment, synchronization loads the proprietary executable file and other associated files in the palmtop. Prior to synchronization, during the decompression, unzipping, or other extraction of the third-party files, a scan of the files takes place on the desktop or other host computer using a "validator" program. For this embodiment, the validator program is a specially constructed emulator. It is called an emulator because emulation of an operating environment is one technique for determining the presence of Trojans or viruses.

The emulator/validator, during the pre-synchronization scan in this embodiment, searches for and finds routines within the software that are used by Trojans and/or viruses. Once a file is scanned, it is flagged with a some form of digital signature, allowing or denying its loading onto the palmtop. Once validated and flagged as being clean of viruses or Trojans, or "valid", the file is then loaded and employed by the palmtop as usual.

In this embodiment, the validator is maintained in a secure environment. This environment would be for the purpose of ensuring the security of the validator itself.

In a further embodiment of the emulator/validator, the scan for the routines used by Trojans and viruses could be performed by operating the software in question in an emulated environment. The emulator/validator would be allowed, in this environment, to completely explore the results of every possible execution of the software, thus ensuring not only against known adverse signatures but also those new ones as yet undiscovered. Such a robust evaluation could result in an extremely high level of confidence in the resulting "valid" applications.

It is envisioned, in this embodiment, that the process described above would be operated in a modified operating system (OS). In some embodiments, some palmtops would be selected as being reserved to "secure" use in order to only have the modified, secure, OS in place and ensure that the OS itself was not compromised. It is possible, in some embodiments, that the secure OS would not allow direct peer-to-peer beaming of applications.

Figure 1A:
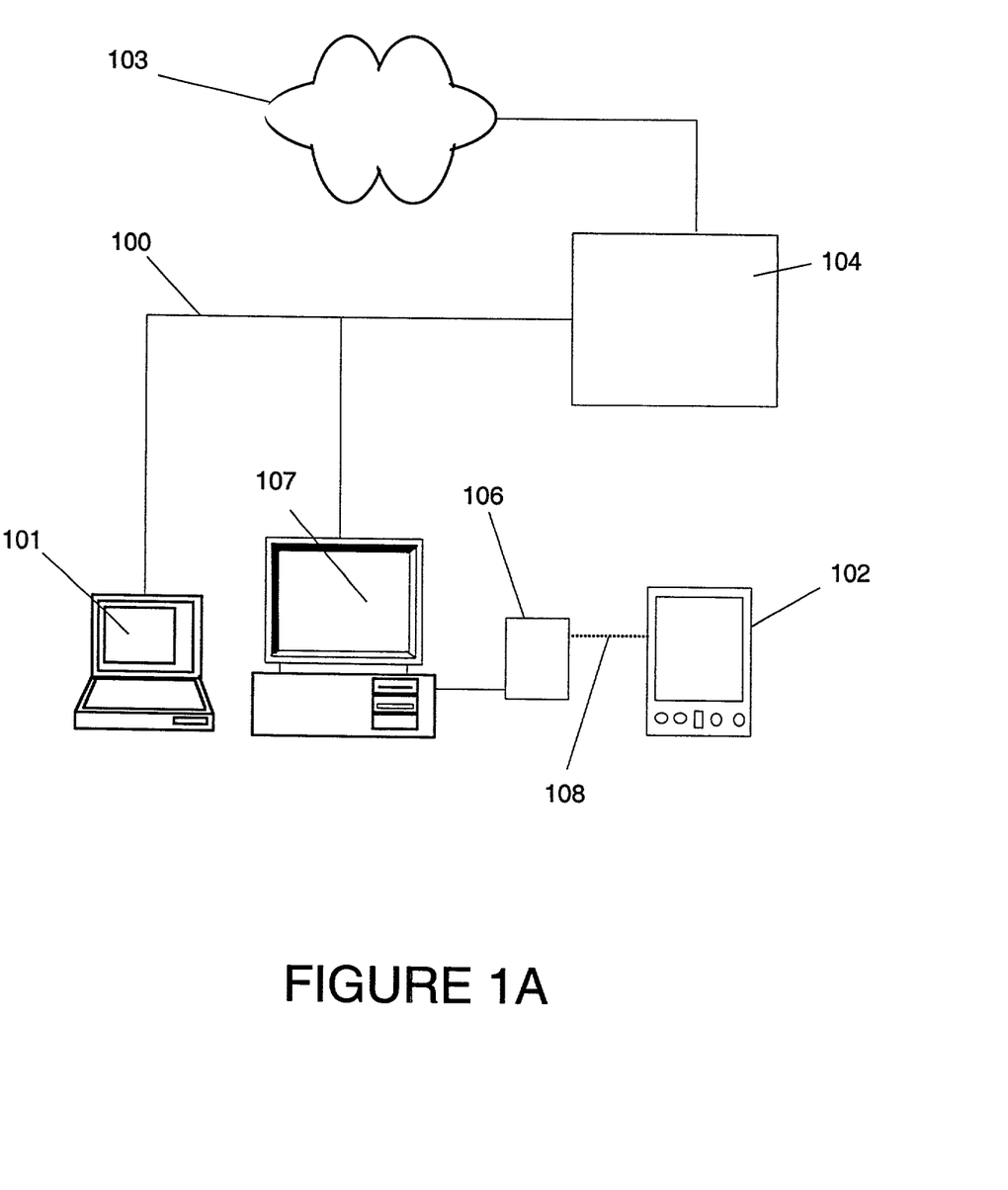
FIG. 1A illustrates a typical network environment in accordance with one embodiment of the present invention.

The process envisioned in this embodiment is best visualized by reference to the Figures. FIG. 1A illustrates a typical environment, in this case a computer network, in which one embodiment of the present invention could operate. Palmtop device 102 is coupled to a host desktop computer 107 via cradle 106 and its attendant link 108. Desktop 107 is in turn coupled to local area network (LAN) 100 as are server 104 and another computer 101, in this case a laptop. Access to Internet 103 is gained through server 104.

This embodiment envisions the downloading of the desired third-party application software from Internet 103 through server 104 and then to host computer 107 where the proprietary files would be extracted. At this point, the extracted software files would be scanned by the validator software within host 107, according to whatever validation method is followed by the validator, which would check each file for known or suspected Trojans or viruses. Only after a successful scan and a flagging of the application file would it then be uploadable to PDA 102 during a subsequent HotSync via cradle 106 and link 108.

Figure 1B:
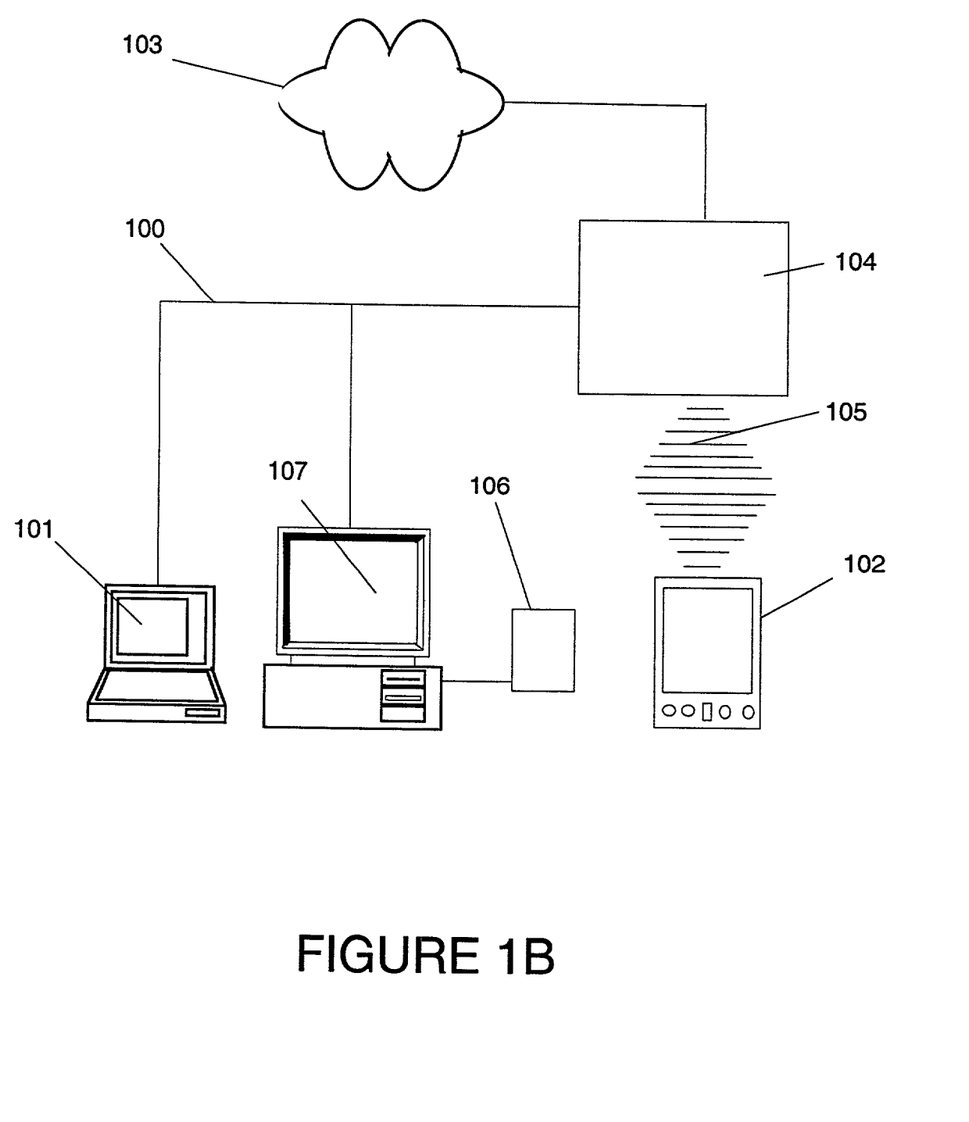
FIG. 1B illustrates another typical network environment in accordance with one embodiment of the present invention.

FIG. 1B illustrates a further embodiment in which PDA 102 is coupled to LAN 100 through a wireless link 105 to server 104. In this embodiment, it is server 104 that processes the third-party software. It is also server 104 here that would host the guardian software.

Figure 1C:
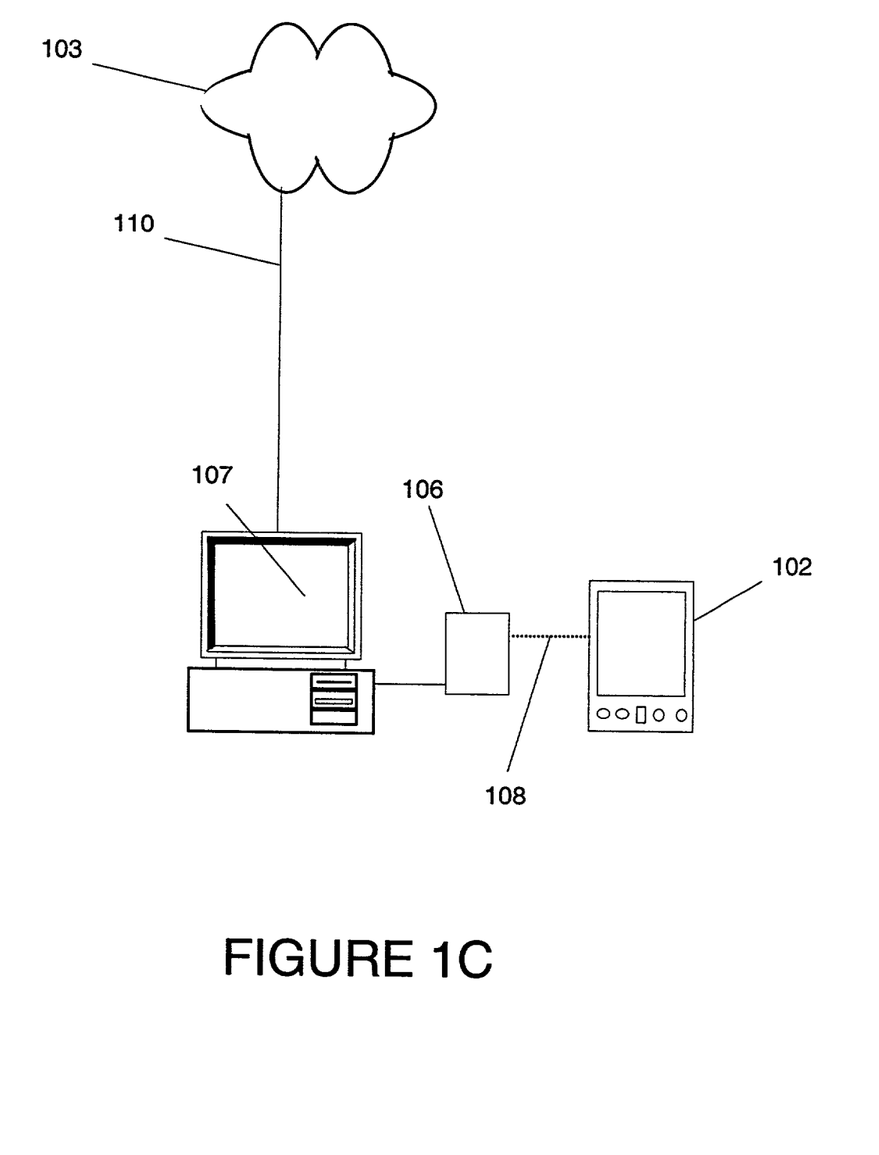
FIG. 1C illustrates another typical computing environment in accordance with one embodiment of the present invention.

Yet another possible embodiment is illustrated in FIG. 1C. Here, in the configuration most often encountered by the home user, host computer 107 supplies link 110 to Internet 103. Again, host computer 107 in this embodiment would be the residing place of the validator software.

Figure 1D:
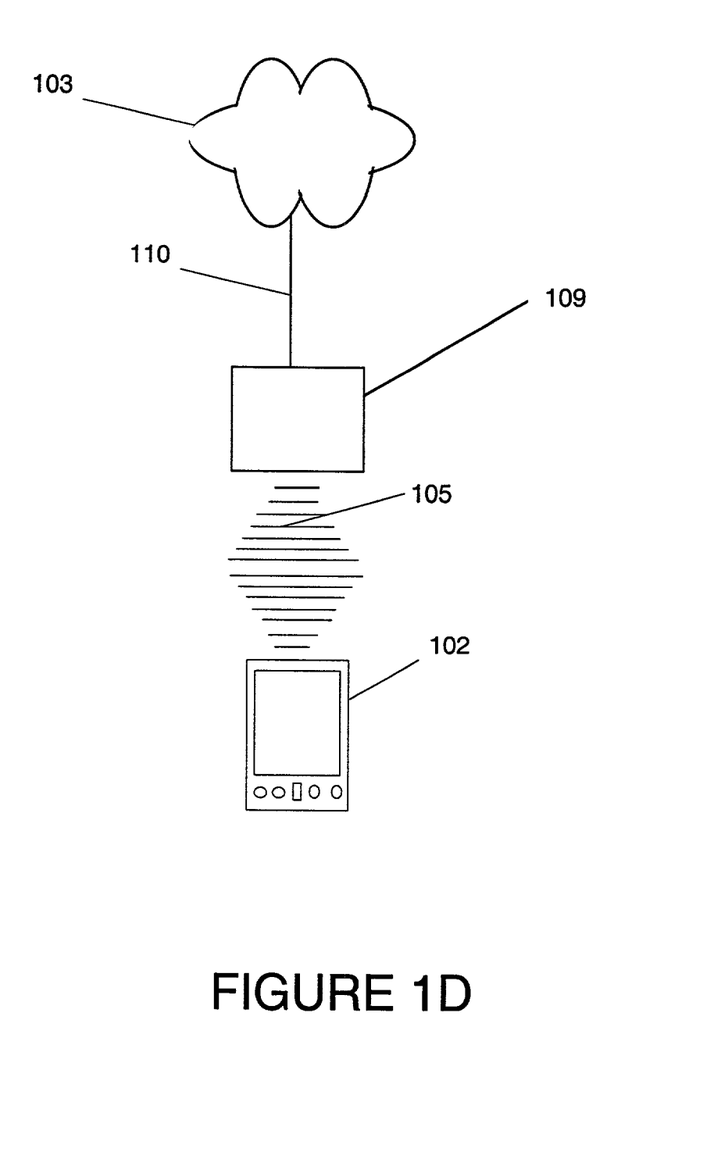
FIG. 1D illustrates another typical computing environment in accordance with one embodiment of the present invention.

In still another embodiment, illustrated in FIG. 1D, a palmtop computer communicates directly with the internet. In this embodiment, the function of the host computer, as the residence of the validator/emulator program, could be taken up by a secure location on the Internet.

Figure 2:
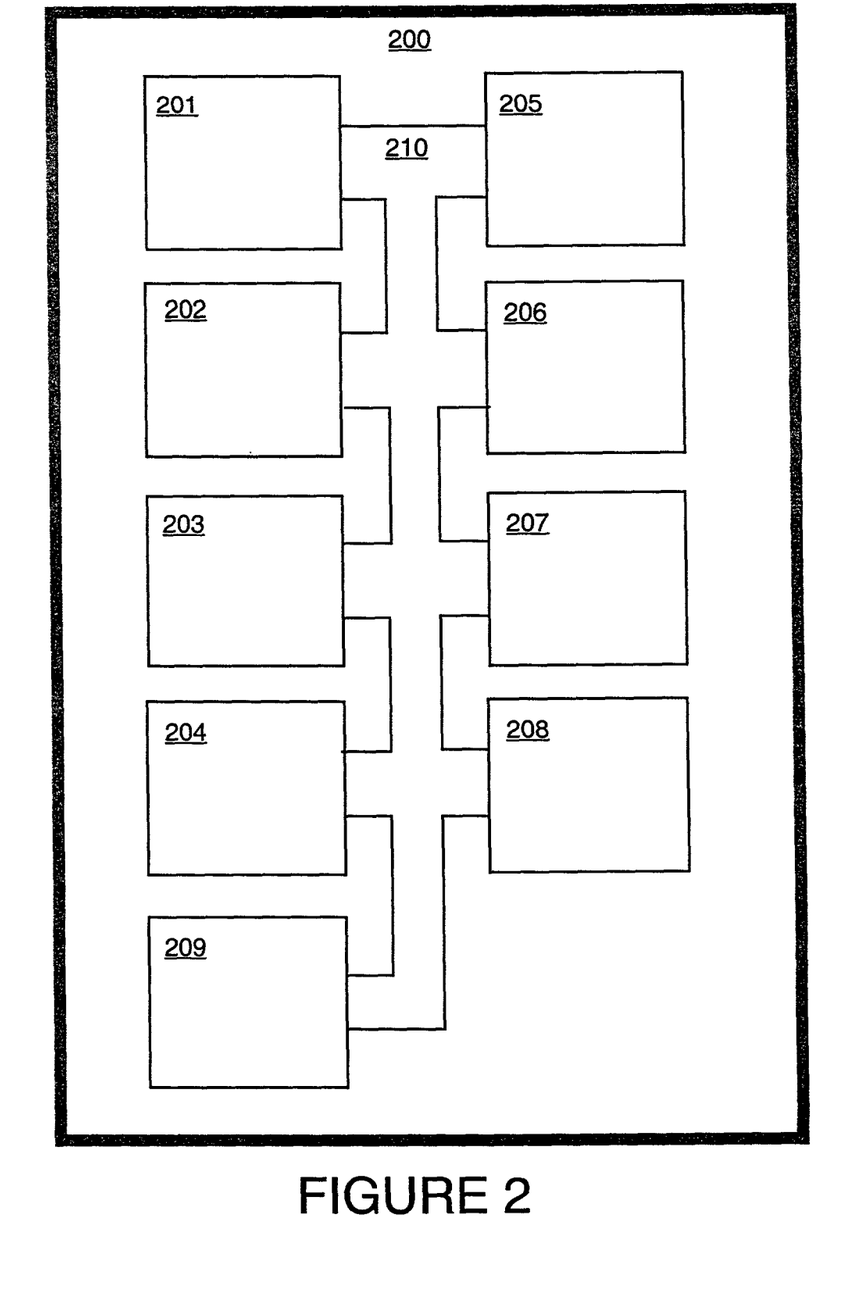
FIGS. 2 is a block diagram illustrating an embodiment of a portable computer system in accordance with the present invention.

FIG. 2 illustrates, in block diagram, the configuration of a typical portable computing device, palmtop computer or PDA consistent with this embodiment of the present invention. Computer system 200 comprises bus 210 which connects processor 201, volatile RAM 202, non-volatile ROM 203 and data storage device 204. Also connected to the bus are display device 205, alphanumeric input device 206, cursor control 207, and signal I/O devices 208 and 209. In the embodiment of the present invention described here, signal input/output device 208 is an Infrared transmitter/receiver and device 209 is an RF transmitter/receiver. In a further embodiment, signal I/O device 209 could be a "Bluetooth" enabled device as well as being enabled in any other type of communications format.

Figure 3:
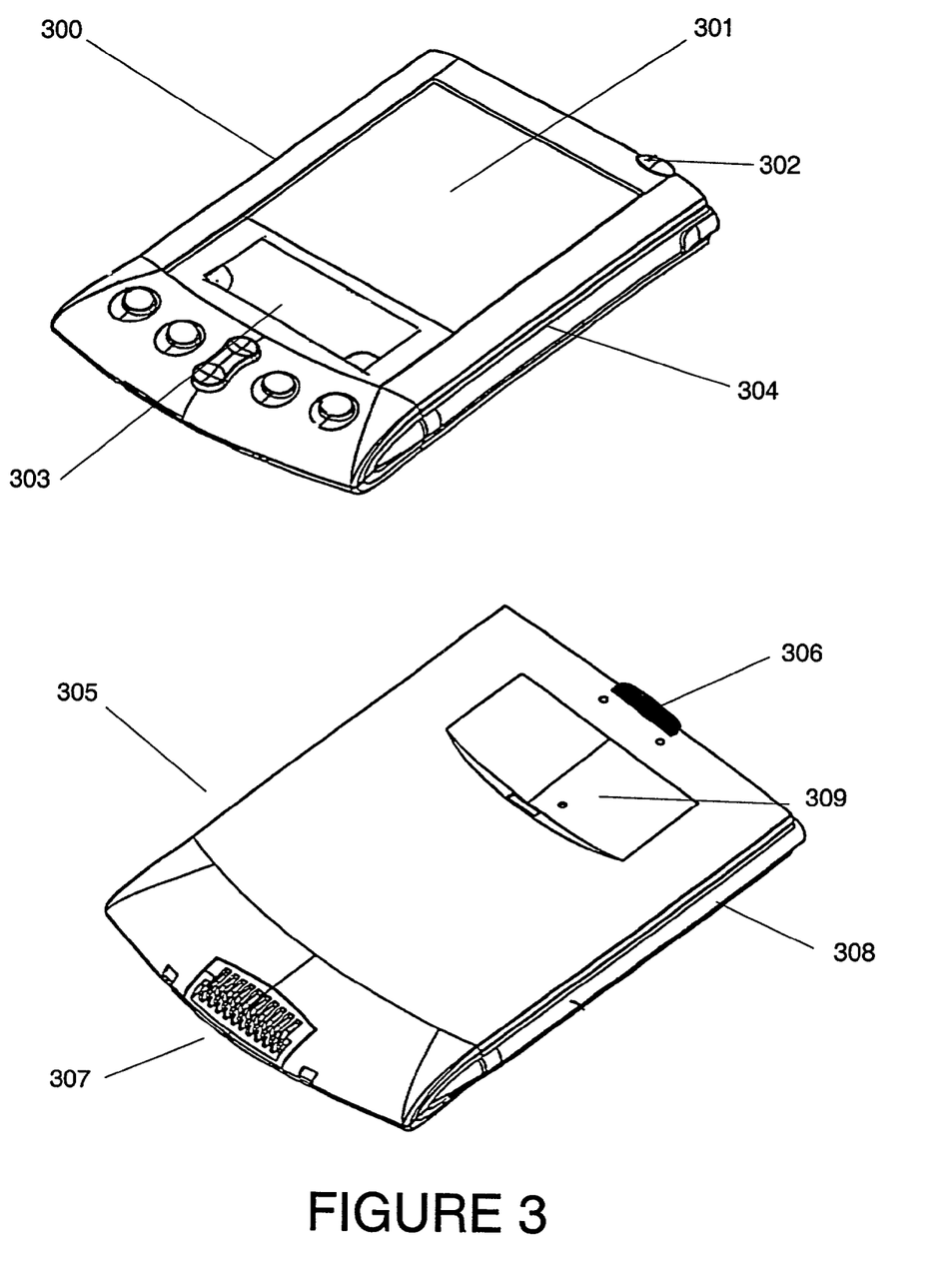
FIG. 3 illustrates a physical embodiment of a portable computer system in accordance with one embodiment of the present invention.

The category of portable computing devices envisioned in this embodiment can include "palmtop" computers and PDAs. A typical palmtop computer that can be used in various embodiments of the present invention is illustrated in FIG. 3, in top and bottom views. Panel 301, in top view 300, integrates display and, when touched with stylus 304, cursor control. Alpha-numeric input is via input panel 303. Power to the device is applied when on/off button 302 is depressed. Connection to a network can be implemented either through an RF connection using extendible antenna 308, or by infrared (IR) connection. IR connection is provided by IR window 306 which is shown on bottom view 305. Connector array 307 provides the capability for wired connectivity to a desktop computer and thence a network by the use of a cradle. Although implemented in this embodiment as a serial port, wired connectivity via connector 307 could also alternatively be any of a number of well known communication standards and protocols, e.g., parallel, SCSI (small computer system interface), Firewire (IEEE 1394), Ethernet, etc.

Figure 4:
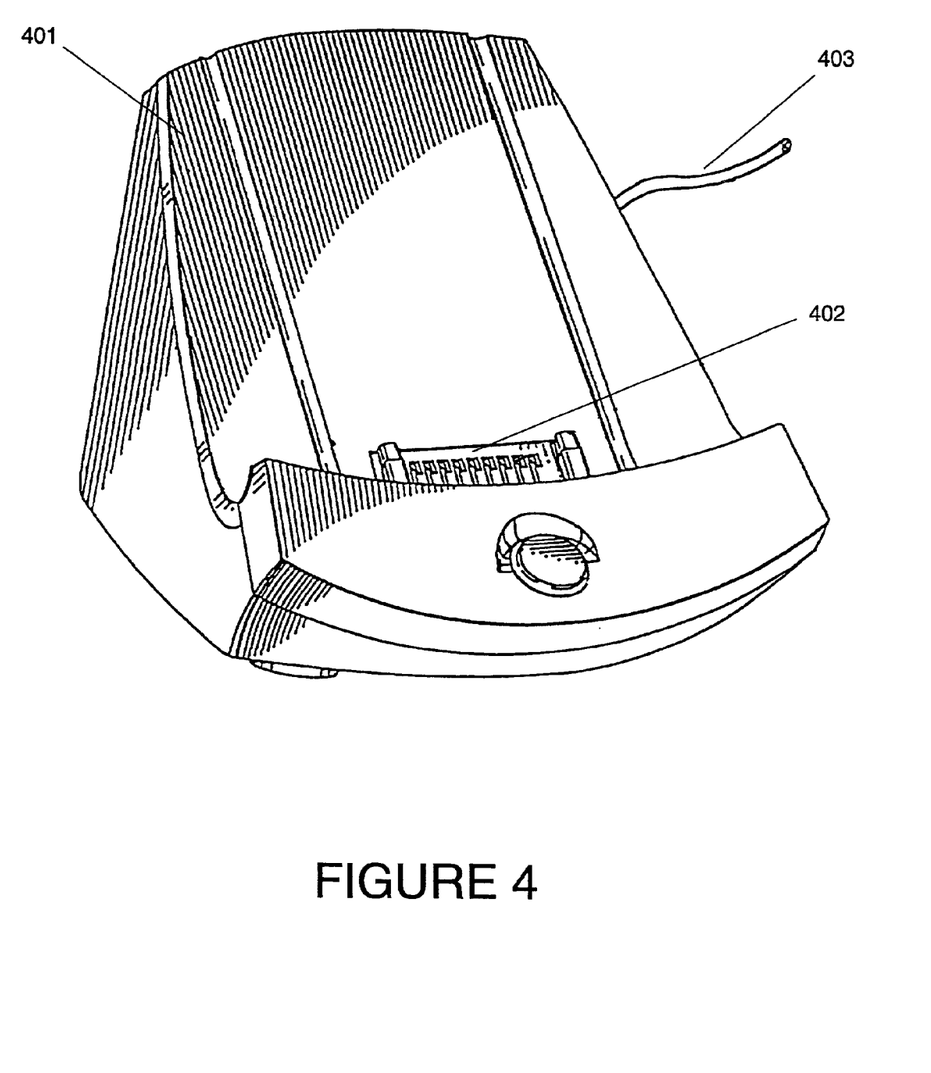
FIG. 4 illustrates a cradle for a hard-wired connection of a typical portable computing device in accordance with one embodiment of the present invention.

A typical cradle is illustrated in FIG. 4. The PDA is set in base 401 which causes contact between the PDA's connector array 307 and the cradle connector array 402. Array 402 is, in this embodiment, the terminus of serial cable 403 which connects the host computer's serial bus.

Figure 5:
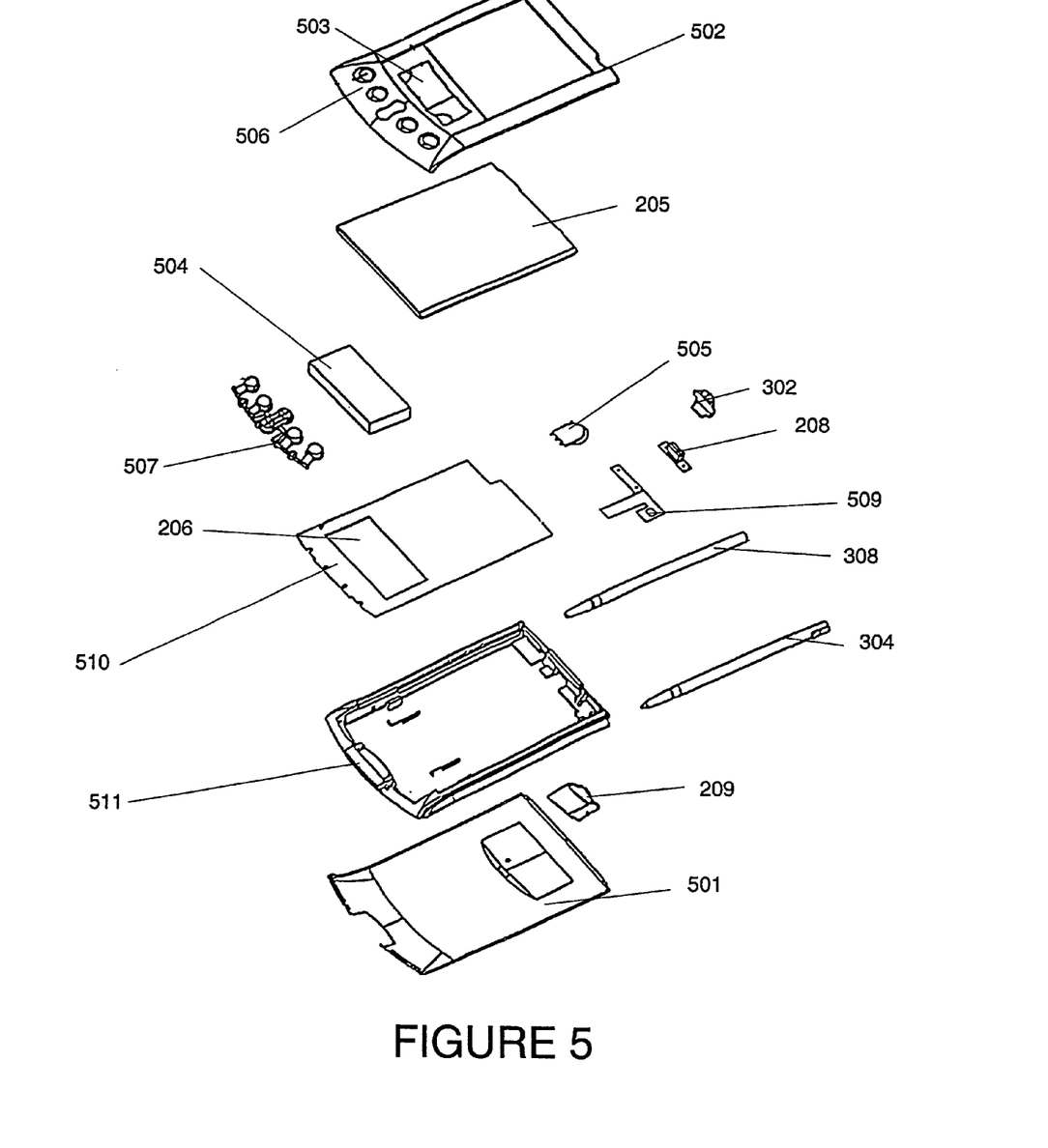
FIG. 5 illustrates an exploded view of a typical portable computing device in accordance with one embodiment of the present invention.
Figure 6:
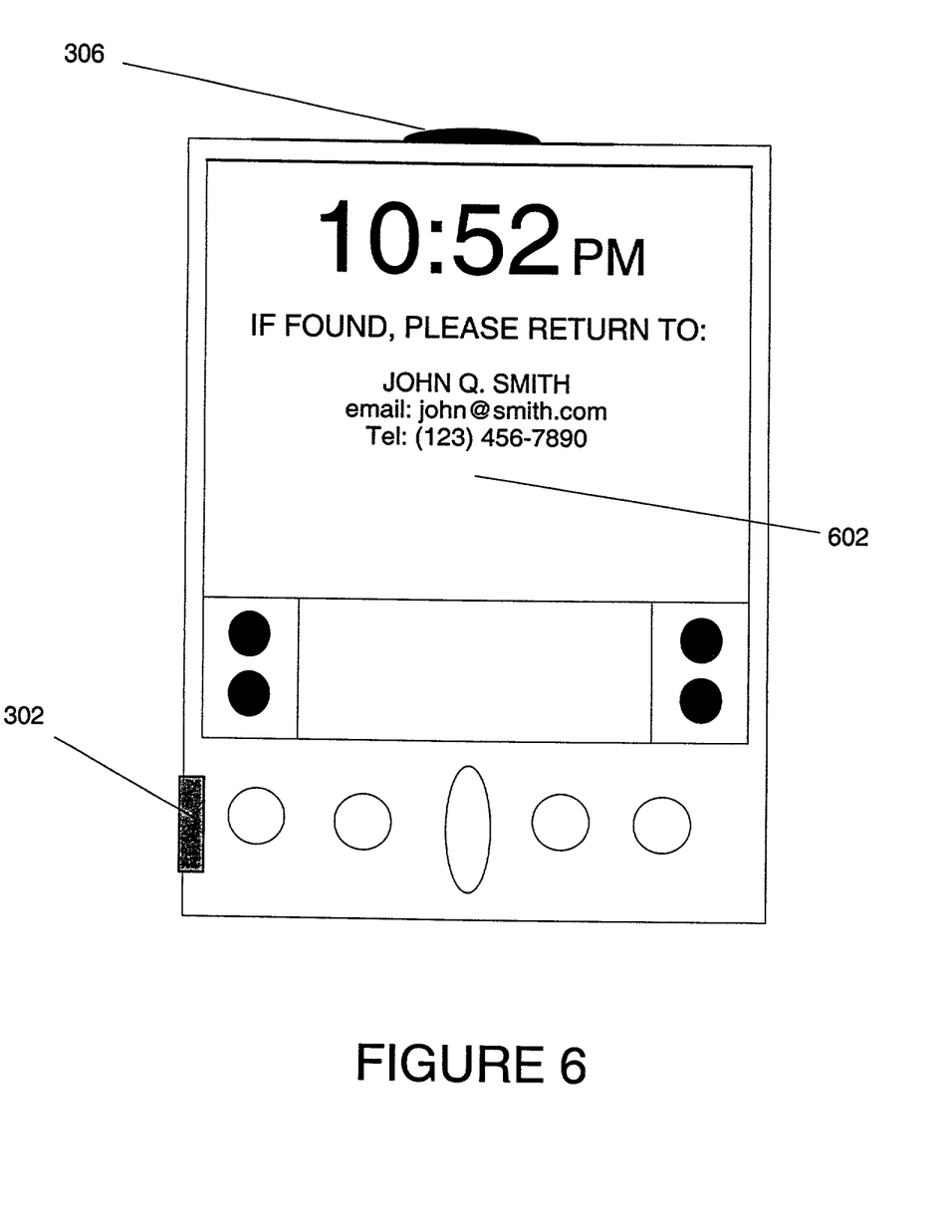
FIG. 6 illustrates one possible implementation of a display in accordance with one embodiment of the present invention.

FIG. 5 is an exploded view of the palmtop computer system 200 in accordance with one implementation. Computer system 200 contains a back cover 501 and a front cover 502 having an outline of region 503 and holes 506 for receiving buttons 507. A flat panel display 205 (both liquid crystal display and touch screen) fits into front cover 502. Any of a number of display technologies can be used, e.g., liquid crystal display (LCD), field emission display (FED), plasma, etc., for the flat panel display 205. A battery 504 provides electrical power. A contrast adjustment 505, a potentiometer in this embodiment, is also shown, as well as an on/off button 302. A flex circuit 509 is shown along with a printed circuit (PC) board 510 containing electronics and logic (e.g., memory, communication bus, processor, etc.) for implementing computer system functionality. The digitizer pad 206, implementing one means of alpha-numeric input, is also included in PC board 510. A midframe 511 is shown along with stylus 304. Position-adjustable antenna 308 is also shown.

Infrared communication mechanism 208 (e.g., an infrared emitter and detector device) is for sending and receiving information from other similarly equipped devices or, in this embodiment, communicating with a network (see FIG. 1A). An embodiment implementing communication with a network through the infrared device does not preclude additional implementation of communication through other means such as an RF link.

To illustrate the implementation of an RF link in an embodiment of the present invention, a signal (e.g., radio) receiver/transmitter device 209 is also shown in FIG. 5. The receiver/transmitter device 209 is coupled to the antenna 308 and also coupled to communicate with the PC board 510. In one implementation, the Mobitex wireless communication system is used to provide two-way communication between computer system 100 and other networked computers and/or the Internet via a proxy server (see FIG. 1D item 109).

FIG. 5 illustrates the implementation of several features illustrated in FIG. 2. Some circuitry of computer system 200 can be implemented directly on PC board 510 (FIG. 5). PC board 510 can contain processor 201, bus 210, ROM 203 and RAM 202.

With reference still to FIGS. 2 and 5, computer system 200 also includes signal transmitter/receiver device 209, which is coupled to bus 210 for providing a physical communication link between computer system 200, and a network environment (e.g., network environment 100 of FIG. 1A). As such, signal transmitter/receiver device 209 enables central processor unit 201 to communicate wirelessly with other electronic systems coupled to the network. It should be appreciated that within the present embodiment, signal transmitter/receiver device 209 is coupled to antenna 308 (FIGS. 3 and 5) and provides the functionality to transmit and receive information over a wireless communication interface. It should be further appreciated that the present embodiment of signal transmitter/receiver device 209 is well suited to be implemented in a wide variety of ways. For example, signal transmitter/receiver device 209 could also be implemented as a modem.

Figure 7:
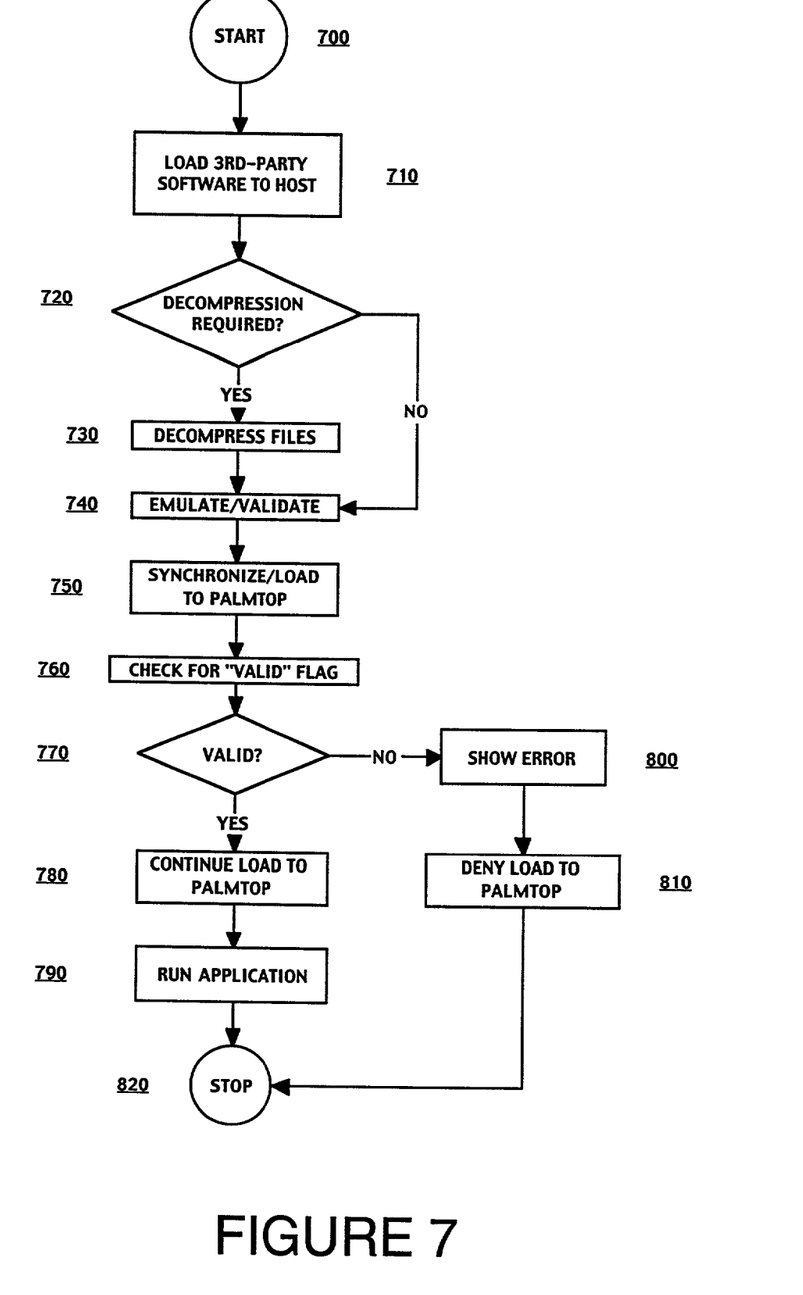
FIG. 7 is a flow chart illustrating a possible process of operation of one embodiment of the present invention.

The process by which the acquisition, validation and loading of third-party software takes place in one embodiment may best be envisioned by reference to the flow chart in FIG. 7.

In process 700, selected third-party software is loaded to the host computer, 710, whether by package media or from a network source. If the software requires decompression/decryption, 720, it is then decompressed/decrypted, 730. Whether requiring decompression/decryption or not, the resulting files are then emulated/validated, 740, and selected for synchronization/load, 750. When selected, the files are checked for the secure flag the indicates valid (not containing known viruses or Trojans) at 760. If valid, 770, the files are loaded to the palmtop/PDA, 780, and run normally at 790. However, if the secure signature flag does not indicate a valid file, an error message is generated, 800, load to the palmtop/PDA is stopped, 810, and use of the file is stopped at 820.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of ensuring the security of an open platform, the method comprising the steps of:
    loading software suitable for securely operating within an open platform environment on a computer system compliant with the open platform environment, the computer system consisting of a host computer and a portable computing device;
    upon loading the software on the computer system, initiating a pre-synchronization scan;
    during the pre-synchronization scan, validating the software by the use of a validator program residing within a secure environment in the computer system such that the validator program scans the software that is loaded in the secure environment;
    wherein the act of scanning and validating comprises running the code in an emulator for the computer system within the secure environment comprising a modified operating system for the emulator to run in, allowing the execution of the code to be examined for any new malicious routines as well as against known malicious signatures;
    marking the software that is loaded as valid or invalid by the use of a flag; and,
    automatically denying the software the ability to operate on any environment within the computer system and denying synchronization of the software with the portable computer device if the validator fails to identify said software as valid.

2. The method described in claim 1 wherein the software is supplied by a third-party source.

3. The method described in claim 2 wherein the third-party software is for execution or other use on the portable computing device, wherein the device is a palmtop computer.

4. The method described in claim 1 wherein the validator program is specially constructed to reside in the host computer.

5. An apparatus for ensuring the security of an open platform comprising:
    a portable computing device coupled to a host computer, wherein the portable computing device is configured to load software from the host computer to the portable computing device for operating on the portable computing device; and,
    a validation program residing on the host computer in a secure environment that is configured for:
    validating the software during a pre-synchronization scan by first scanning the software that is loaded in the secure environment;
    wherein the act of scanning and validating comprises running the code in an emulator on the host computer within the secure environment comprising a modified operating system for the emulator to run in, allowing the execution of the code to be examined for any new malicious routines as well as against known malicious signatures;
    marking the software as valid or invalid by the use of a flag; and,
    automatically denying the software the ability to operate in any environment on the host computer or portable computing device and denying synchronization of the software with the portable computing device if the validator fails to identify the software as valid.

6. The apparatus described in claim 5 wherein the host computer is coupled to a network.

7. The apparatus described in claim 5 wherein the portable computing device is a handheld computing device.

8. The apparatus described in claim 5 wherein the portable computing device is a personal data assistant.

9. The apparatus described in claim 5 wherein the portable computing device is coupled to the host computer by an infrared device.

10. The apparatus described in claim 5 wherein the portable computing device is coupled to said host computer by an RF enabled device.

11. The apparatus described in claim 5 wherein the validation program is configured to evaluate third-party software and attach a digital valid flag if the third-party software is found to be clean of known security compromising routines or attach a digital invalid flag to the third-party software in the third-party software is not found to be clean of known security compromising routines.

12. The apparatus described in claim 11 wherein the portable computing device is configured to load third-party software files with the digital valid flag attached and to refrain from loading third-party software files which have no flag attached or have the invalid flag attached.

13. The apparatus described in claim 11 wherein the portable computing device is a Personal Data Assistant.

14. An apparatus for ensuring the security of an open platform computer system comprising:
    a handheld computing device coupled to a network, wherein the handheld computing device is configured to load software from the network to the handheld computing device for operation on the handheld computing device; and,
    a validation program that resides on the network that is configured for:
    validating the software by scanning files of the software in a secure environment on the handheld computing device upon loading the software in any environment on the handheld computing device;
    wherein the act of scanning and validating comprises running code of the software in an emulator within the secure environment for the emulator to run in, allowing the execution of the code to be examined for any new malicious routines as well as against known malicious signatures;
    marking the software as valid or invalid by the use of a flag; and,
    automatically denying the software the ability to operate on any environment on the handheld computing device if said validator fails to identify the software as valid.

15. The apparatus described in claim 14 wherein the validation program resides in the network in a secure fashion.

16. The apparatus described in claim 14, wherein the handheld computing device is configured to load third-party software files with the digital valid flag attached and to refrain from loading third-party software files which have no flag attached or have the invalid flag attached.

17. The apparatus described in claim 14 wherein the validation program is configured to evaluate third-party software and attach a digital valid flag if the third-party software is found to be clean of known security compromising routines or attach a digital invalid flag to the third-party software in the third-party software is not found to be clean of known security compromising routines.

\* \* \* \* \*